(12) United States Patent
Shier et al.

(10) Patent No.: US 6,944,524 B2
(45) Date of Patent: Sep. 13, 2005

(54) AIR CYLINDER CONTROLLER

(75) Inventors: William W. Shier, Watertown, WI (US); Lee H. Theusch, Alto, WI (US); James D. Snavley, Fishers, IN (US)

(73) Assignee: Marsh Bellofram Corporation, Newell, WV (US)

( * ) Notice: Subject to any disclaimer, the term of this patent is extended or adjusted under 35 U.S.C. 154(b) by 0 days.

(21) Appl. No.: 10/765,753

(22) Filed: Jan. 27, 2004

(65) Prior Publication Data

US 2004/0186630 A1 Sep. 23, 2004

Related U.S. Application Data

(60) Provisional application No. 60/444,074, filed on Jan. 31, 2003.

(51) Int. Cl.[7] .............................. G05D 23/00
(52) U.S. Cl. ................. 700/301; 700/282; 702/98; 702/138
(58) Field of Search ................. 700/282, 301; 702/98, 138; 137/14

(56) References Cited

U.S. PATENT DOCUMENTS 4,720,807 A * 1/1988 Ferran et al. ............... 700/282
4,901,758 A * 2/1990 Cook et al. ................. 137/487.5
5,142,483 A * 8/1992 Basham et al. ............. 702/47

* cited by examiner

Primary Examiner—Leo Picard
Assistant Examiner—Ryan A. Jarrett
(74) Attorney, Agent, or Firm—Fay, Sharpe, Fagan, Minnich & McKee, LLP

(57) ABSTRACT

An air flow regulator includes a damper (14) and an air cylinder (20) operatively connected with the damper (14) to adjust a damper setting. A pressure sensor (52) indicates a pneumatic pressure in the air cylinder (20). An air pressure regulator (42) is operatively connected with the air cylinder (20) to pressurize and exhaust the air cylinder (20) responsive to an electrical input (70). The air pressure regulator (42) includes a calibration table (64) associating steady state air cylinder pressure values with regulator shut-off pressure values. Responsive to the electrical input (70) updating a steady-state air cylinder pressure value, the air pressure regulator (42) pressurizes or exhausts the air cylinder (20) until the pressure sensor (52) indicates a pressure corresponding to a regulator shut-off pressure value associated in the calibration table (64) with the updated steady-state air cylinder pressure value, whereupon the air pressure regulator (42) ceases the pressurizing or exhausting.

22 Claims, 5 Drawing Sheets

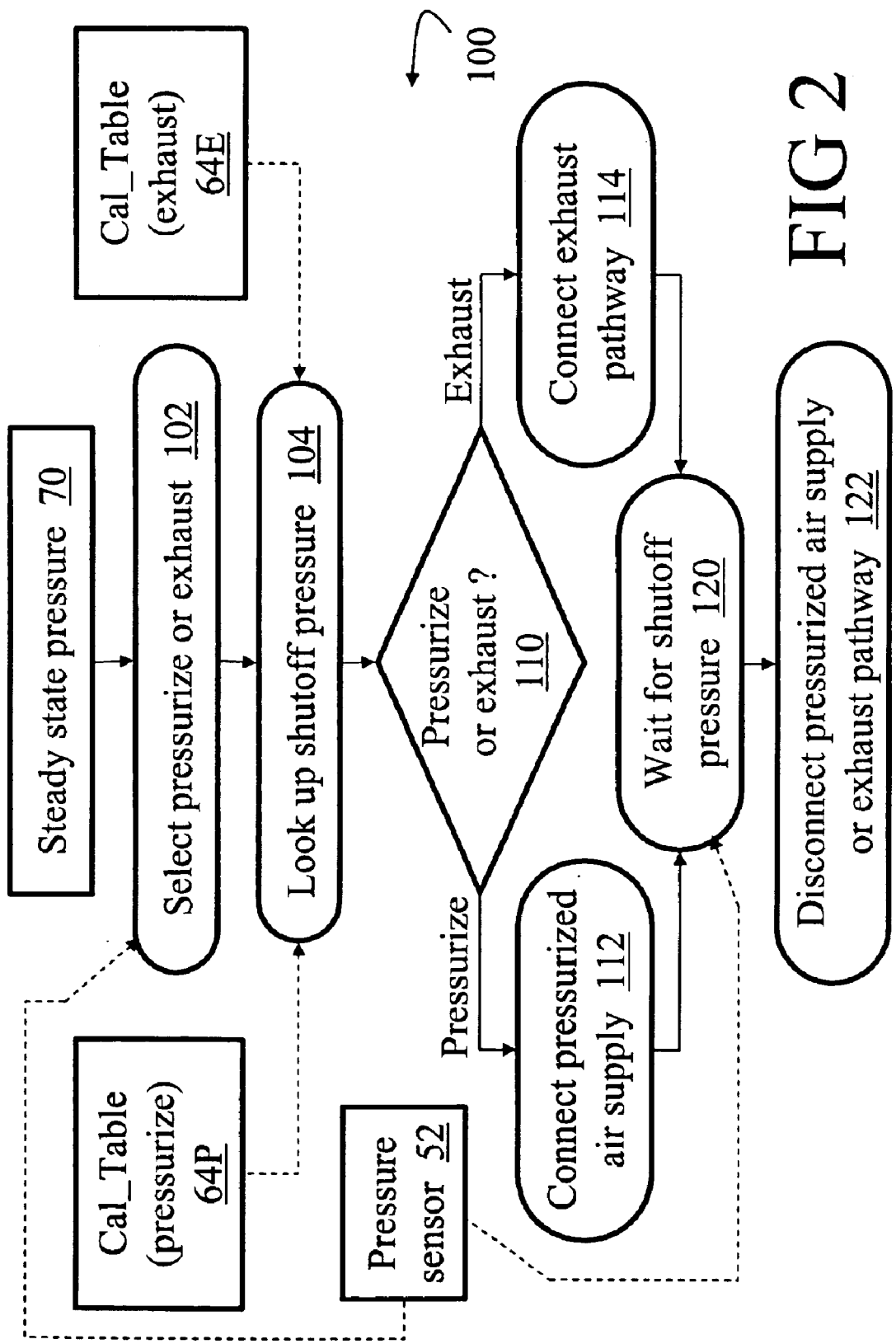

AIR CYLINDER CONTROLLER

This application claims the benefit of U.S. Provisional Application Ser. No. 60/444,074, filed Jan. 31, 2003.

BACKGROUND

The present invention particularly relates to controlled operation of dampers in heating and air conditioning systems, especially high volume air conditioning (HVAC) systems, and will be described with particular reference thereto. The invention relates more generally to controlled operation of air cylinders and pneumatic/mechanical transducer systems, particularly for controlling fluid flow.

In heating and air conditioning systems, conditioned air is distributed through a house, office building, or other structure through air ducts. Typically, the conditioned air is forced through a duct at a constant air speed, and control of the heating or cooling for a particular room or area of the house, office building, or other structure is effected by partially restricting air flow through a duct using one or more strategically placed dampers.

The damper setting is typically effected through a pneumatic actuating system that includes an electropneumatic transducer, such as an air cylinder controlled by an electronic air pressure regulator, which operates on the damper. The air pressure regulator pressurizes or exhausts the air cylinder to cause an actuating arm of the air cylinder to move, thus causing the damper setting to be adjusted.

A problem arises in that air cylinders and other pneumatic devices can exhibit hysteresis, pressure drift, frictional settling delays, and other operating non-linearities and non-regularities. These non-regularities are usually air cylinder-specific, and may be different even for nominally similar air cylinders of the same make and model. Moreover, the operating non-regularities depend upon the operating environment of the air cylinder or other pneumatic device. Thus, the air cylinder characteristics may depend upon the type of damper being controlled, the air flow through the duct, and similar parameters.

Control of such pneumatic devices is difficult, because the hysteretic, frictional, mechanical or other delays result in long settling times as the air cylinder relaxes to a steady state. During this settling time, the pressure transiently varies in the air cylinder. The air pressure regulator attempts to respond to such transient pressure variations by repeatedly switching between pressurizing and exhausting the air cylinder. This can further increase the settling time, and additionally creates noises that travel through the ducts of the HVAC system and can be disturbing to people in the house, office building, or other structure.

The present invention contemplates an improved apparatus and method that overcomes the aforementioned limitations and others.

BRIEF SUMMARY

According to one aspect, an air flow regulator is disclosed. A pneumatic cylinder is operatively connected with a damper to adjust a damper setting. A pressure sensor indicates a pneumatic pressure in the pneumatic cylinder. An air pressure regulator is operatively connected with the pneumatic cylinder to pressurize or exhaust the pneumatic cylinder responsive to an electrical input indicative of a selected steady state pressure. The air pressure regulator includes a calibration table associating steady state pneumatic cylinder pressure values with regulator shut-off pressure values. The calibration table is addressed by the electrical input indicative of an updated steady-state pneumatic cylinder pressure value. The calibration table retrieves a shutoff pressure value corresponding to the electrical input. The air pressure regulator ceases the pressurizing or exhausting at the retrieved shutoff pressure value such that the steady state pressure in the pneumatic cylinder settles at about the selected steady state pressure.

According to another aspect, a method is provided for controlling a pneumatic cylinder which has a lag between termination of pressurization or evacuation and reading a steady state pressure. A desired steady-state pressure is received. A shut-off pressure corresponding to the desired steady-state pressure is retrieved. The shut-off pressure is different from the corresponding steady state pressure. The pneumatic cylinder is pressurized or exhausted. The pressurizing or exhausting is terminated when a measured pneumatic cylinder pressure corresponds to the shut-off pressure.

According to another aspect, a storage medium encodes instructions executed by a computer or microprocessor to perform a control method for controlling an electropneumatic transducer. The control method includes: constructing a table associating steady state pressures with pressure regulator shutoff pressures; receiving a steady-state pressure value; retrieving a shutoff pressure corresponding to the steady state pressure from the table; and causing a pressure regulator to operate open loop on the electropneumatic transducer until a pressure feedback signal associated with the electropneumatic transducer reaches the retrieved shutoff pressure. Upon the pressure feedback signal reaching the shutoff pressure, the control method causes the pressure regulator to cease operating on the electropneumatic transducer.

According to yet another aspect, a controller is disclosed for controlling an electropneumatic transducer. An air pressure regulator has a first valve for selectively connecting and disconnecting a pressurized air supply and a second valve for selectively connecting and disconnecting an exhaust. Configurable electronics are configured to receive a steady state pressure, access a configured calibration to obtain a shut-off pressure associated with the received steady state pressure, cause a selected one of the first valve and the second valve to connect, and cause the selected one of the first valve and the second valve to disconnect responsive to an instantaneous pressure corresponding to the obtained shut-off pressure.

According to still yet another aspect, a method of regulating air flow in a duct system with a pneumatic cylinder controlled damper is provided. An air flow is selected. The selected air flow is converted into a corresponding steady state pneumatic cylinder pressure. A corresponding shutoff pressure is determined from which the pneumatic cylinder will settle at the corresponding steady state pressure. Pressure in the pneumatic cylinder is changed until the shutoff pressure is reached. The pneumatic cylinder is allowed to settle from the shutoff pressure to the steady state pressure corresponding to the selected flow rate.

One advantage resides in reduced noise during damper operation.

Another advantage resides in more rapid transient response and reduced settling time for damper setting changes.

Yet another advantage resides in ready adaptation of the pneumatic control for specific characteristics of the damper, air cylinder, draft characteristics, and other parameters of the air conditioning system.

Numerous additional advantages and benefits of the present invention will become apparent to those of ordinary skill in the art upon reading the following detailed description of the preferred embodiments.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

FIG. 2 shows a flow chart of a preferred method for controlling the damper of FIG. 1.

DETAILED DESCRIPTION OF THE PREFERRED EMBODIMENTS

Figure 1:
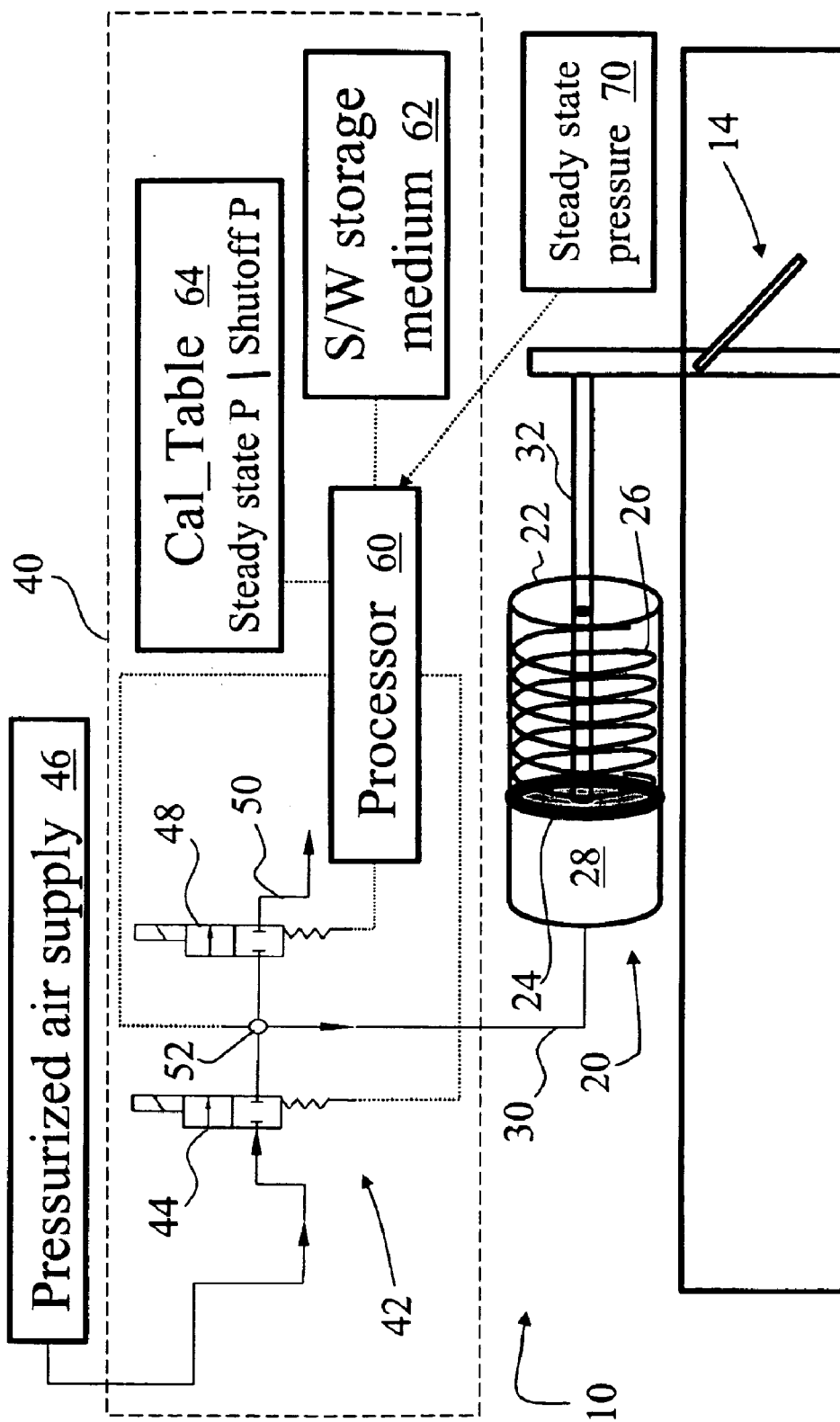
FIG. 1 diagrammatically shows a portion of a high volume air conditioning (HVAC) system including a controlled damper.

With reference to FIG. 1, a high volume air conditioning (HVAC) system 10 includes a plurality of ducts that convey heated, cooled or otherwise conditioned air throughout a building or other structure. In FIG. 1, the duct system is represented by exemplary duct 12. At selected places throughout the duct system, dampers are arranged to selectively control air flow. In FIG. 1, the various dampers are represented by an exemplary damper 14, which is a hinged damper. However, butterfly dampers, louvered dampers, or the like, and various combinations of such dampers, can also be employed. The HVAC system 10 typically further includes selected other components known in the art, such as a furnaces, flues, air conditioning units, particulate filters, registers, return air ducts, and the like, which are not shown in FIG. 1.

The damper 14 is moved by a pneumatic actuator, which in the exemplary embodiment of FIG. 1 is an air cylinder 20. The pneumatic air cylinder 20 includes a generally cylindrical body 22 that contains a biased piston 24 that is biased by a compressed spring 26 toward a compressed air volume 28. In operation, an air line 30 delivers compressed air to pressurize the compressed air volume 28. The increased pressure drives the piston 24 against the bias spring 26. To move the piston 24 in the reverse direction, the air line 30 partially or totally exhausts the compressed air volume 28 to reduce the pressure in the compressed air volume 28. In response to the reduced pressure, the bias spring 26 moves the piston 24 toward the compressed air volume 28. An actuator arm 32 attached to the piston 24 communicates the linear piston motion of the piston 24 to the damper 14, where intervening gearing or other mechanical components (not shown) convert linear motion of the actuator arm 32 into movement of the damper 14.

The damper 14 is controlled via the air cylinder 20 by a controller 40, which includes an air pressure regulator 42. The air pressure regulator 42 includes a first valve 44 that selectively connects the air line 30 with a pressurized air supply 46. The air pressure regulator also includes a second valve 48 that selectively connects the air line 30 with an exhaust pathway 50, which in a preferred embodiment exhausts to the ambient air. Alternatively, the pressurized air supply 46 can be replaced by another gas or a liquid (in the latter case providing hydraulic operation), in which case the exhaust pathway 50 is preferably contained. A pressure sensor 52 provides a pressure feedback signal indicative of instantaneous pressure in the air line 30. As the air line 30 is in continuous fluid communication with the pressurized air volume 28 of the air cylinder 20, the pressure sensor 52 monitors pressure in the air volume 28 of the air cylinder 20. Of course, a pressure sensor physically located at and directly monitoring the pressurized air volume 28 can also be employed.

The controller 40 further includes a processor 60 that selectively operates the valves 44, 48 to place the air pressure regulator 42 into one of three states: a pressurizing state in which the first valve 44 is open to connect the pressurized air supply 46 with the compressed air volume 28 of the air cylinder 20 and the second valve 48 is closed; an exhaust state in which the first valve 44 is closed and the second valve 48 is open to connect the compressed air volume 28 with the exhaust pathway 50; and an isolation state in which both valves 44, 48 are closed to pneumatically isolate the compressed air volume 28 of the air cylinder 20.

The processor 60 is suitably a microcontroller, a microprocessor, a computer, or the like, which executes software instructions stored on a non-volatile medium 62 which is suitably embodied as an electronic read-only memory, a Flash memory, a magnetic disk, an optical disk, or the like. In a preferred embodiment the non-volatile storage medium 62 is a programmable read-only memory (PROM), erasable PROM (EPROM), Flash memory, or the like integrated with the processor 60 or connected with the processor 60 by printed circuitry of a printed circuit board. The controller 40 further includes a calibration table 64 which provides a correlation between instantaneous pressures at which the air pressure regulator 42 is placed in the isolation state and corresponding steady state pressures in the compressed air volume 28 of the air cylinder 20. The calibration table 64 can be stored in a Flash memory, magnetic storage medium, or other read/write-capable non-volatile memory. The processor 60 receives a steady state pressure 70 from the HVAC system controller (not shown) and operates the valves 44, 48 to set the air cylinder 20 to that steady state pressure.

With continuing reference to FIG. 1 and with further reference to FIG. 2, in a preferred embodiment the non-volatile storage medium 62 stores a software program that instructs the processor 60 to cause the controller 40 to perform a control method 100 in response to receiving a new steady state pressure 70. By comparing the new steady state pressure 70 with the present reading of the pressure sensor 52, a selection is made 102 as to whether the air pressure controller 42 should act to further pressurize the air volume 28 or to partially or fully exhaust the air volume 28 in order to attain the target steady state pressure 70.

As is known in the art, certain pneumatic actuators such as the air cylinder 20 typically exhibit hysteresis, pressure drift, frictional settling delays, and other operating non-linearities and non-regularities. Feedback control of such pneumatic devices typically exhibits long settling times, erratic convergence to steady state, and noisy operation due to repeated pressurizing and exhausting responsive to the non-regularities which are difficult to model and account for within a PID or other conventional control framework.

To overcome these difficulties, the method 100 employs an open loop control based on parameters stored in the calibration table 64. In a preferred embodiment which recognizes that the operating non-regularities are generally different for the pressurization and exhausting operations of the air cylinder 20, the calibration table 64 includes a pressurizing calibration table 64P and an exhausting calibration table 64E. The calibration values store shutoff pressure values that correspond to steady state pressure values.

Thus, for the target steady state pressure value 70 and the selected direction of operation (pressurize or exhaust), a look-up 104 is performed in the appropriate calibration table 64E (for exhausting) or 64P (for pressurizing) to obtain a shutoff pressure corresponding to the target steady state pressure 70. The lookup 104 preferably performs an interpolation between data points of the table 64 to obtain an appropriate shutoff pressure if the target steady state pressure 70 is not one of the data points of the calibration table 64. Alternatively, the calibration table 64 can be in the form of empirical fitted mathematical expressions for the pressurizing and exhausting correspondence curves.

A branch 110 of the control method 100 selects the appropriate operation mode of the air pressure regulator 42: either pressurizing operation or exhausting operation. If pressurizing operation is selected, then in a process operation 112 the pressurized air supply 46 is connected with the air cylinder 20. This is suitably accomplished by placing the air pressure regulator 42 into the pressurizing state in which the first valve 44 is open to connect the pressurized air supply 46 with the compressed air volume 28 of the air cylinder 20 and the second valve 48 is closed.

Alternatively, if exhausting operation is selected, then in a process operation 114 the air cylinder 20 is connected with the exhaust pathway 50. This is suitably accomplished by placing the air pressure regulator 42 into the exhaust state in which the first valve 44 is closed and the second valve 48 is open to connect the compressed air volume 28 with the exhaust pathway 50.

Once the appropriate operating state of the air pressure regulator 42 is established, the air cylinder 20 is pressurized or exhausted, causing an increase or reduction in pressure, respectively, over time. At a process operation 120, the method 100 monitors the instantaneous pressure indicated by the pressure sensor 52 until the instantaneous pressure reaches the shutoff pressure obtained in the lookup operation 104.

When the shutoff pressure from the table 64P, 64E is reached, the pressurized air supply 46 or the exhaust pathway 50 is disconnected from the air cylinder 20 in a process operation 122. This is suitably accomplished by placing the air pressure regulator 42 into the isolation state in which both valves 44, 48 are closed to pneumatically isolate the compressed air volume 28 of the air cylinder 20.

Once isolated, the air cylinder typically exhibits the hysteresis, pressure drift, frictional settling delays, or other operating non-linearities or non-regularities of the particular air cylinder 20. Such hysteresis, pressure drift, frictional settling delays, or other operating non-linearities or non-regularities are accounted for in constructing the calibration table 64, so that pneumatic isolation of the air cylinder 20 at the shutoff pressure selected in the lookup operation 104 results in the air cylinder 20 settling in at the target steady state pressure 70.

The calibration table 64 is preferably constructed empirically. The various non-linearities and non-regularities of the air cylinder 20 vary from air cylinder to air cylinder. While such non-regularities are usually consistent for a given specific air cylinder, there are commonly substantial variations in the non-regularities between different air cylinders, and even between commercial air cylinders of the same model which are made by the same-manufacturer.

Moreover, the hysteresis, pressure drift, frictional settling delays, or other operating non-linearities or non-regularities are affected by the environment in which the air cylinder operates. In the exemplary HVAC system 10, such environmental parameters include air flow in the duct 12, characteristics of the damper 14, and mechanical characteristics of the connection between the actuator arm 32 and the damper 14. Hence, construction of the calibration table 64 is preferably performed in situ, that is, with the air cylinder 20 installed in the HVAC system 10 and connected with the specific damper 14 which is to be actuated.

Figure 3A:
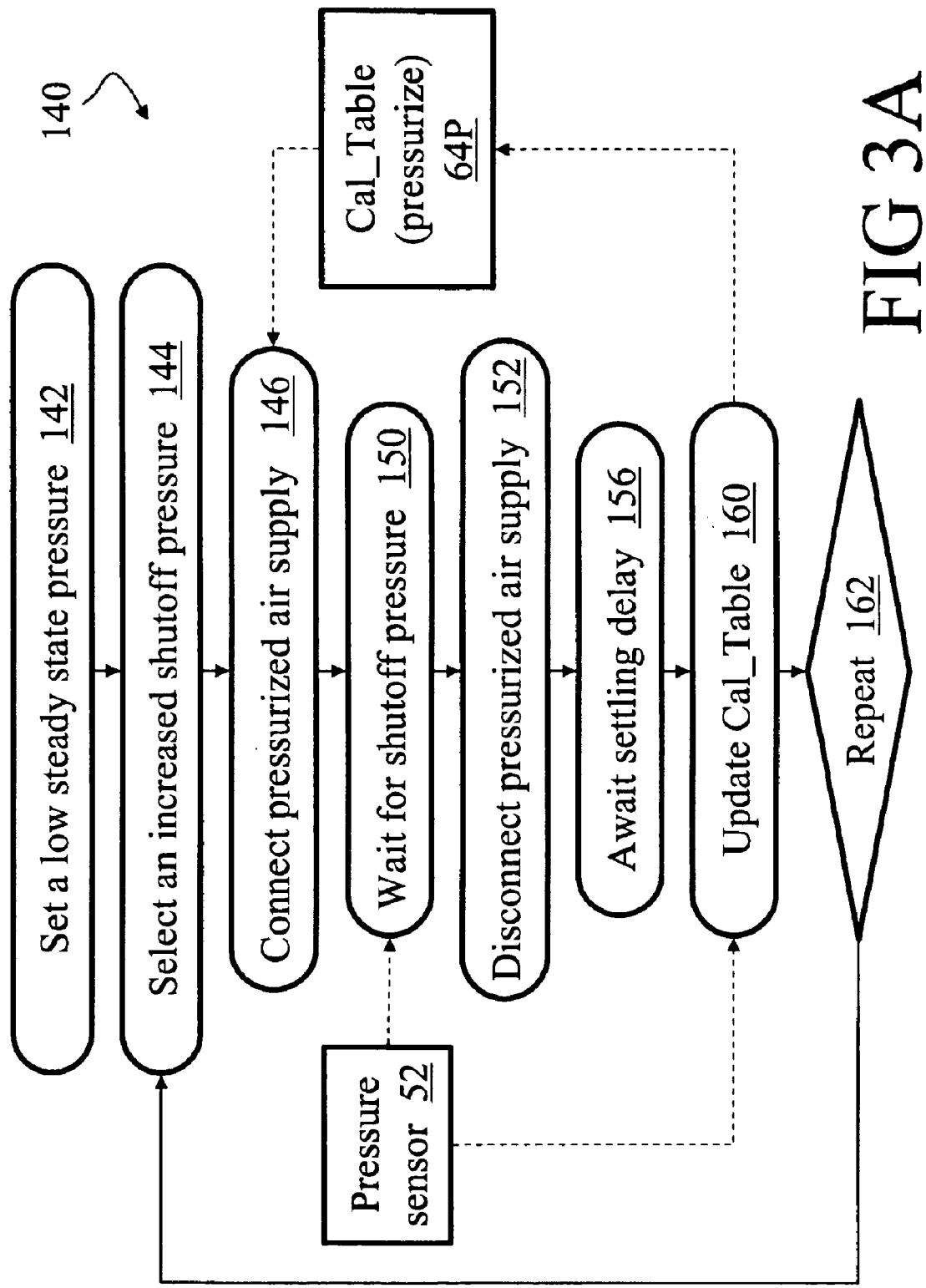
FIG. 3A shows a preferred method for constructing a pressurizing portion of the calibration table of FIG. 1.

With continuing reference to FIG. 1 and with further reference to FIG. 3A, in a preferred method 140 the pressurizing calibration table 64P is constructed as follows. The air cylinder 20 is initially set to a low pressure in process 142. This is accomplished by opening the second valve 48 and closing the first valve 44 (or maintaining the first valve 44 in the closed state) for a time period sufficient to exhaust the air cylinder 20 to a low pressure, or until a selected low pressure is reached, followed by pneumatically isolating the air cylinder 20 by closing the second valve 48 while maintaining the first valve 44 in the closed state.

A first shutoff pressure is selected 144. This selected shutoff pressure should be greater than the initial low pressure setting of the process operation 142. The pressurized air supply 46 is connected to the air cylinder 20 in process operation 146 by opening the first valve 44 and maintaining the second valve 48 in the closed state. The pressure sensor 52 is monitored 150 to detect when the instantaneous pressure corresponds to the shutoff pressure, at which point the pressurized air supply 46 is disconnected 152 from the air cylinder 20 by closing the first valve 44 while maintaining the second valve 48 in the closed state. With both valves 44, 48 closed, the air pressure regulator 42 is in the isolation state, and the air cylinder 20 is pneumatically isolated.

The method 140 then pauses 156 for a preselected settling delay time to allow the air cylinder 20 to settle to a steady state pressure. After the preselected delay 156, the pressure sensor 52 is read to determine the steady state pressure corresponding to the shutoff pressure, and the pressurizing calibration table 64P is updated 160 to indicate correspondence between the measured steady state pressure and the shutoff pressure. The process operations 144, 146, 150, 152, 156, 160 are repeated 162 for several increasing shutoff pressures to complete the pressurizing calibration table 64P.

Figure 3B:
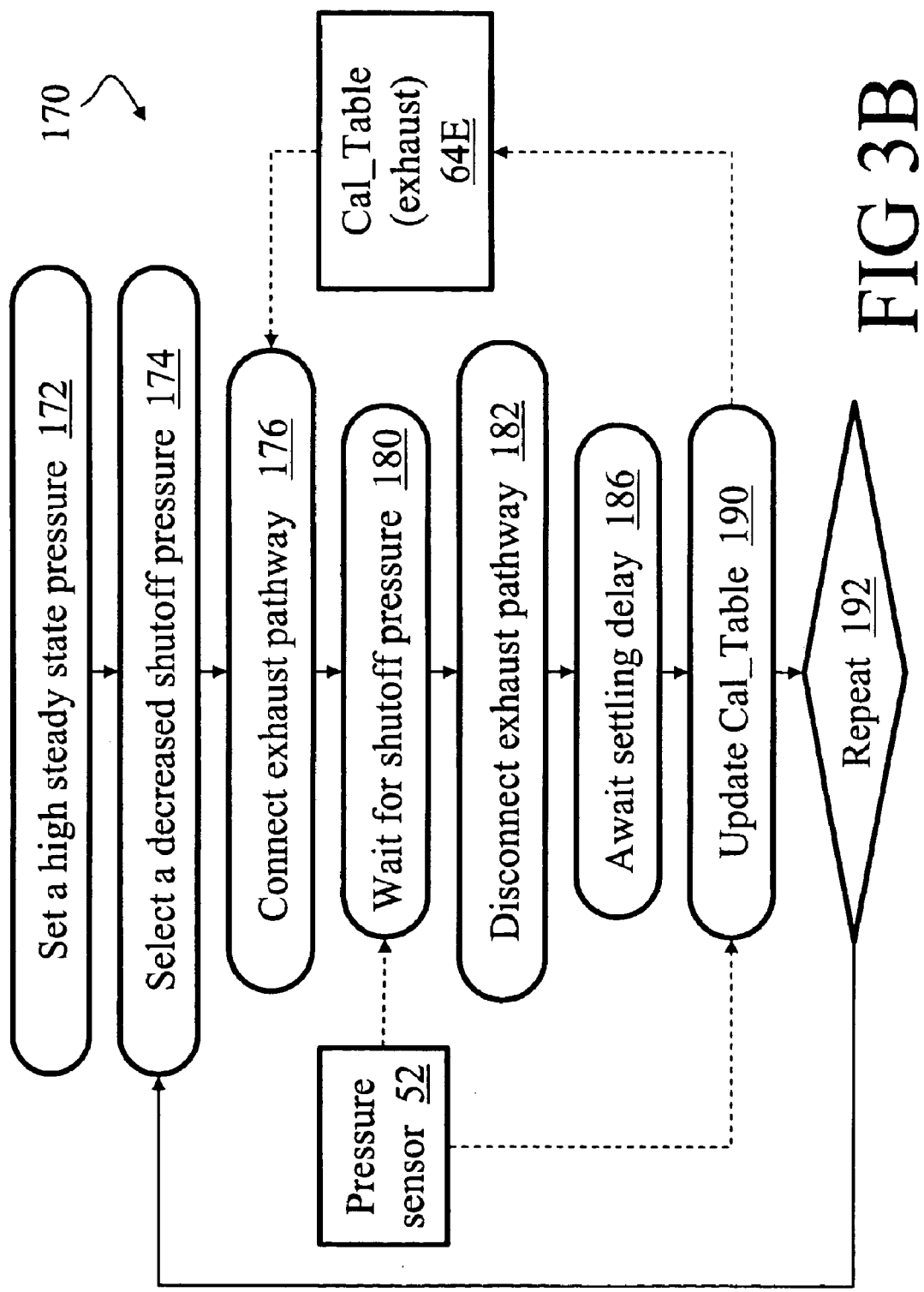
FIG. 3B shows a preferred method for constructing an exhausting portion of the calibration table of FIG. 1.

With continuing reference to FIG. 1 and with further reference to FIG. 3B, in a preferred method 170 the exhausting calibration table 64E is constructed as follows. The air cylinder 20 is initially set to a high pressure in process 172. This is accomplished by opening the first valve 44 and closing the second valve 48 (or maintaining the second valve 48 in the closed state) until a selected high pressure is reached, followed by placing the air pressure regulator 42 into the isolation state by closing the first valve 44 while maintaining the second valve 48 in the closed state.

A first shutoff pressure is selected 174. This selected shutoff pressure should be lower than the initial high pressure setting of the process operation 172. The exhaust pathway 50 is connected to the cylinder in process operation 176 by opening the second valve 48 and maintaining the first valve 44 in the closed state. The pressure sensor 52 is monitored 180 to detect when the instantaneous pressure corresponds to the shutoff pressure, at which point the exhaust pathway 50 is disconnected 182 from the air cylinder 20 by closing the second valve 48 while maintaining the first valve 44 in the closed state. With both valves 44, 48 closed, the air pressure regulator 42 is in the isolation state, and the air cylinder 20 is pneumatically isolated.

The method 170 then pauses 186 for a preselected settling delay time to allow the air cylinder 20 to settle to a steady state pressure. After the preselected delay 186, the pressure sensor 52 is read to determine the steady state pressure corresponding to the shutoff pressure, and the exhaust calibration table 64E is updated 190 to indicate correspondence between the measured steady state pressure and the shutoff pressure. The process operations 174, 176, 180, 182, 186, 190 are repeated 192 for several decreasing shutoff pressures to complete the pressurizing calibration table 64E.

In employing the described calibration table construction methods 140, 170 for pressurizing and exhausting, respectively, it is recognized that hysteresis may cause the pressurizing characteristics of the air cylinder 20 to be substantially different from the exhausting characteristics. However, for certain air cylinders the air cylinder response may be even more state-dependent. For example, a transition from one-quarter of full pressure to half of full pressure may have a different transient response compared with a transition from substantially fully exhausted to half of full pressure. The calibration table 64 optionally includes additional correspondence data to account for such state-dependent characteristics.

Moreover, the calibrations 140, 170 may need to be repeated occasionally. In one embodiment, it is contemplated to perform the calibration methods 140, 170 at the installation of the air cylinder 20, and also after major maintenance to the air cylinder 20, damper 14, or other related components. Recalibration is also preferably performed after replacement of the damper 14, or after a substantial change in a rate of air flow through the duct 12. Optionally, the calibration table 64 is updated more frequently using an automated update method, as described next.

Figure 3C:
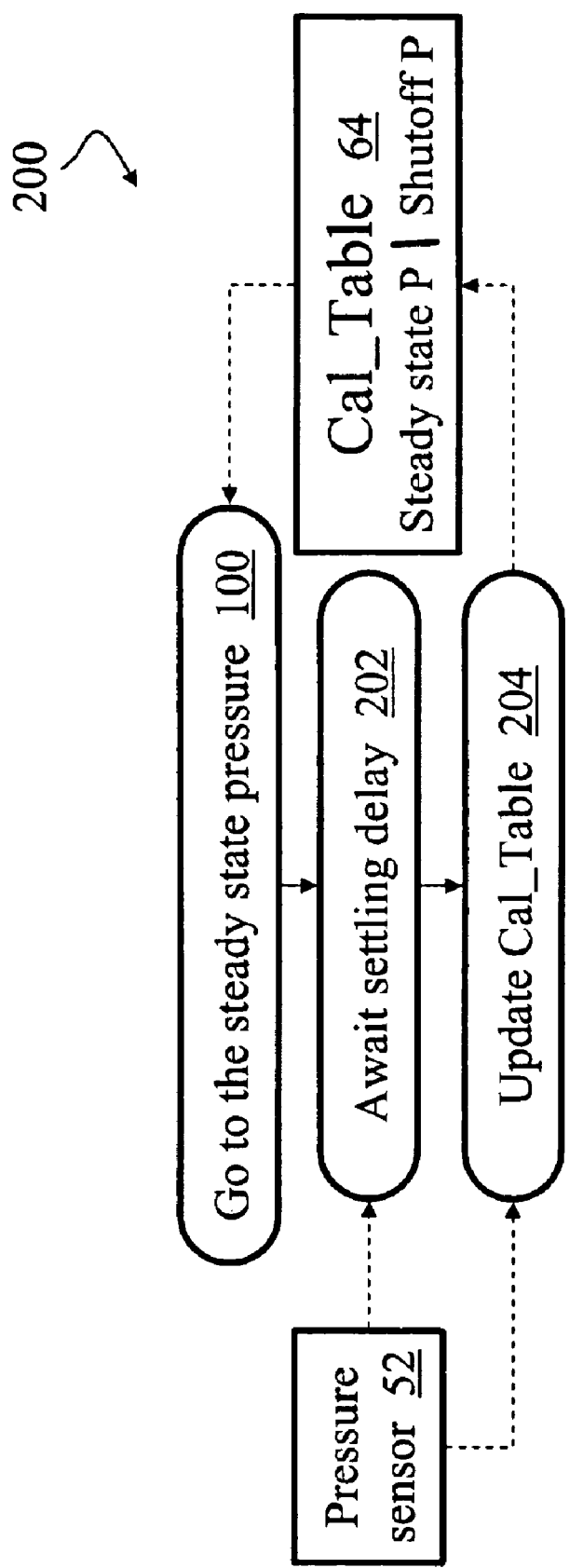
FIG. 3C shows a preferred method for automatically updating the calibration table of FIG. 1 each time a new damper setting is applied.

With continuing reference to FIGS. 1 and 2, and with further reference to FIG. 3C, a suitable method 200 for automatically updating the calibration table 64 each time a setting of the damper 14 is changed is described. The method 200 is preferably performed after the initial calibrations 140, 170 are performed to initialize the calibration table 64. In the method 200, each time a damper setting is changed in accordance with the method 100, the processor 60 waits 202 a preselected settling period after the air cylinder 20 is isolated 122 in order to allow the air cylinder 20 to reach a steady state. After the delay 202, the pressure sensor 52 is read to ascertain the steady state pressure, which is used to influence the initial calibration table values to gradually improve accuracy. The pressure is recorded 204 as corresponding to the shutoff pressure used in the method 100.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. An air flow regulator including:
   a damper; and
   a pneumatic cylinder operatively connected with the damper to adjust a damper setting;
   a pressure sensor that indicates a pneumatic pressure in the pneumatic cylinder; and
   an air pressure regulator operatively connected with the pneumatic cylinder to pressurize or exhaust the pneumatic cylinder responsive to an electrical input indicative of a selected steady state pressure, the air pressure regulator including a calibration table associating steady state pneumatic cylinder pressure values with regulator shut-off pressure values, the calibration table being addressed by the electrical input indicative of an updated steady-state pneumatic cylinder pressure value and retrieving a corresponding shutoff pressure value at which the air pressure regulator ceases the pressurizing or exhausting such that the steady state pressure in the pneumatic cylinder settles at about the selected steady state pressure.

2. The air flow regulator as set forth in claim 1, wherein the air pressure regulator includes:
   a first valved connection between the pneumatic cylinder and a pressurized gas supply;
   a second valved connection between the pneumatic cylinder and an exhaust pathway;
   electrical circuitry for selectively configuring the first and second valved connections into a state selected from a group consisting of:
      a pressurize state in which the first valve is open and the second valve is closed,
      an exhaust state in which the second valve is open and the first valve is closed, and
      an isolation state in which the first and second valves are both closed.

3. The air flow regulator as set forth in claim 2, wherein the air pressure regulator includes:
   a processor operatively connected to the first and second valved connections and the calibration table; and
   a non volatile memory storing control software, the processor executing the control software to responsive to the electrical input to change the steady-state pneumatic cylinder pressure value.

4. The air flow regulator as set forth in claim 1, wherein the calibration table includes:
   a pressurizing calibration table associating steady state pneumatic cylinder pressure values with regulator shut off pressure values, the pressurizing calibration table being accessed responsive to the electrical input updating the steady state pneumatic cylinder pressure value to a higher pressure; and
   an exhausting calibration table associating steady state pneumatic cylinder pressure values with regulator shut off pressure values, the exhausting calibration table being accessed responsive to the electrical input updating the steady state pneumatic cylinder pressure value to a lower pressure.

5. A method for controlling a pneumatic cylinder which has a lag between termination of pressurization or evacuation and reading a steady state pressure, the method including:
   with an electronic processor, receiving an electrical signal indicative of a desired steady-state pressure;
   with the electronic processor, retrieving a shut-off pressure from computer memory corresponding to the desired steady state pressure, the shut off pressure being different from the corresponding steady state pressure;
   pressurizing or exhausting the pneumatic cylinder; and
   terminating the pressurizing or exhausting when a measured pneumatic cylinder pressure corresponds to the shut off pressure.

6. The method as set forth in claim 5, wherein the retrieving of a shut-off pressure corresponding to the desired steady state pressure includes:

retrieving the shut off pressure from a calibration table that relates shut off pressure values with steady state pressure values.

7. The method as set forth in claim 6, further including:

subsequent to the terminating, measuring a steady-state pneumatic cylinder pressure; and with the electronic processor, receiving an electrical signal indicative of the measured steady-state pressure and updating the calibration table with the measured steady-state pressure.

8. The method as set forth in claim 6, further including:

constructing the calibration table by:

(a) pressurizing or exhausting the pneumatic cylinder, (b) terminating the pressurizing or exhausting when a measured pneumatic cylinder pressure corresponds to a selected shut off pressure value, (c) adding a correspondence of the selected shut off pressure value and a steady state pneumatic cylinder pressure measured after the terminating to the calibration table, and (d) repeating the pressurizing (a), the terminating (b), and the adding (c) for a plurality of selected shut off pressure values.

9. The method as set forth in claim 8, wherein the constructing of the calibration table further includes:

(i) performing the processes (a) (d) for a plurality of successively increasing selected shut off pressure values to construct a pressurizing calibration table; and (ii) performing the processes (a) (d) for a plurality of successively decreasing selected shut off pressure values to construct an exhausting calibration table.

10. The method as set forth in claim 8, wherein the retrieving of a shut-off pressure corresponding to the desired steady state pressure includes:

with the electronic processor, interpolating shut off pressure values corresponding to two steady state pneumatic cylinder pressure values of the calibration table that are closest to the desired steady state pressure.

11. A storage medium encoding instructions executed by a computer or microprocessor to perform a control method for controlling an electropneumatic transducer, the control method including:

constructing a table associating steady state pressures with pressure regulator shutoff pressures;

receiving a steady-state pressure value;

retrieving a shutoff pressure corresponding to the steady state pressure from the table;

causing a pressure regulator to operate open loop on the electropneumatic transducer until a pressure feedback signal associated with the electropneumatic transducer reaches the retrieved shutoff pressure; and upon the pressure feedback signal reaching the shutoff pressure, causing the pressure regulator to cease operating on the electropneumatic transducer.

12. The storage medium as set forth in claim 11, wherein the process of causing the pressure regulator to operate open loop on the electropneumatic transducer includes:

selecting one of pressurizing and exhausting based on the shutoff pressure and the pressure feedback signal;

conditional upon selecting pressurizing, causing the pressure regulator to connect a pressurized air supply with the electropneumatic transducer; and conditional upon selecting exhausting, causing the pressure regulator to connect an exhaust pathway with the electropneumatic transducer.

13. The storage medium as set forth in claim 12, wherein the process of causing the pressure regulator to cease operating on the electropneumatic transducer includes:

disconnecting the pressurized air supply or the exhaust pathway from the electropneumatic transducer.

14. The storage medium as set forth in claim 11, wherein the process of constructing a table associating steady state pressures with pressure regulator shutoff pressures includes:

(a) causing the pressure regulator to operate open loop on the electropneumatic transducer until the pressure feedback signal associated with the electropneumatic transducer reaches a first calibration shutoff pressure;

(b) upon the pressure feedback signal reaching the first calibration shutoff pressure, causing the pressure regulator to cease operating on the electropneumatic transducer (c) subsequent to causing the pressure regulator to cease operating, measuring a steady state pressure and recording the measured steady state pressure in the table as corresponding to the shutoff pressure; and (d) repeating the processes (a), (b), and (c) for a plurality of calibration shutoff pressures.

15. The storage medium as set forth in claim 14, wherein the process of constructing a table associating steady state pressures with pressure regulator shutoff pressures includes:

performing the processes (a), (b), (c), and (d) for a plurality of calibration shutoff pressures wherein the process (a) of causing the pressure regulator to operate open loop includes causing the pressure regulator to connect a pressurized air supply with the electropneumatic transducer; and performing the processes (a), (b), (c), and (d) for a plurality of calibration shutoff pressures wherein the process (a) of causing the pressure regulator to operate open loop includes causing the pressure regulator to connect an exhaust pathway with the electropneumatic transducer.

16. The storage medium as set forth in claim 11, wherein the process of constructing a table associating steady state pressures with pressure regulator shutoff pressures includes:

subsequent to causing the pressure regulator to cease operating on the electropneumatic transducer, recording a steady state pressure value corresponding to the pressure feedback signal.

17. The storage medium as set forth in claim 11, wherein the receiving of a steady-state pressure value includes:

receiving a controlled process parameter value; and transforming the received controlled process parameter value into a steady-state pressure value of the electropneumatic transducer corresponding to the received controlled process parameter value.

18. The storage medium as set forth in claim 11, wherein the receiving of a steady-state pressure value includes receiving a steady state controlled process parameter value wherein the steady-state controlled process parameter value corresponds to a steady state pressure of the electropneumatic transducer, and the retrieving of a shutoff pressure includes retrieving from the table a shutoff pressure corresponding to the received steady state controlled process parameter value.

19. A controller for controlling an electropneumatic transducer, the controller including:

an air pressure regulator having a first valve for selectively connecting and disconnecting a pressurized air supply and a second valve for selectively connecting and disconnecting an exhaust; and configurable electronics configured to receive a steady state pressure, access a configured calibration to obtain a shut off pressure associated with the received steady state pressure, cause a selected one of the first valve and the second valve to connect, and cause the selected one of the first valve and the second valve to disconnect responsive to an instantaneous pressure corresponding to the obtained shut off pressure.

20. The controller as set forth in claim 19, wherein the configurable electronics include:

a processor;

one or more non volatile storage media that store software instructions and the configured calibration.

21. The controller as set forth in claim 19, wherein the configured calibration includes:

a pressurizing calibration that associates a shut off pressure with a corresponding steady state pressure that is obtained responsive to disconnecting the first valve when an instantaneous pressure of the electropneumatic transducer corresponds to the shut off pressure; and an exhausting calibration that associates a shut off pressure with a corresponding steady state pressure that is obtained responsive to disconnecting the second valve when an instantaneous pressure of the electropneumatic transducer corresponds to the shut off pressure.

22. A method of automatically regulating air flow rate in a duct system with a pneumatic cylinder controlled damper, the method including:

selecting an air flow rate;

with an electronic processor, converting the selected air flow rate into a corresponding steady state pneumatic cylinder pressure;

with the electronic processor, determining a corresponding shutoff pressure from which the pneumatic cylinder will settle at the corresponding steady state pressure;

changing pressure in the pneumatic cylinder until the shutoff pressure is electronically measured; and allowing the pneumatic cylinder to settle from the shutoff pressure to the steady state pressure corresponding to the selected air flow rate.

* * * * *